United States Patent
Sheehan et al.

(10) Patent No.: US 7,186,290 B2
(45) Date of Patent: Mar. 6, 2007

(54) FILTER SYSTEM WITH AUTOMATIC MEDIA REFRESH

(75) Inventors: Darren S. Sheehan, West Hartford, CT (US); Susan D. Brandes, South Windsor, CT (US); Robert Chiang, Shanghai (CN); Brad Reisfeld, Fort Collins, CO (US)

(73) Assignee: Carrier Corporation, Syracuse, NY (US)

( * ) Notice: Subject to any disclaimer, the term of this patent is extended or adjusted under 35 U.S.C. 154(b) by 420 days.

(21) Appl. No.: 10/754,035

(22) Filed: Jan. 8, 2004

(65) Prior Publication Data
US 2005/0150382 A1 Jul. 14, 2005

(51) Int. Cl.
*B01D 46/00* (2006.01)
(52) U.S. Cl. .............................. 95/277; 95/19; 95/273; 95/285; 96/223; 96/227; 96/421; 96/429; 55/351; 55/352; 55/353; 55/422; 55/481; 55/483; 55/484; 55/497
(58) Field of Classification Search .................. 95/19, 95/273, 277, 285, 286; 55/351, 352, 353, 55/354, 422, 478, 481, 483, 484, 524, 495, 55/497; 96/223, 224, 226, 227, 424, 429
See application file for complete search history.

(56) References Cited

U.S. PATENT DOCUMENTS

| | | | | |
|---|---|---|---|---|
| 3,800,509 A | * | 4/1974 | Carr et al. | 55/352 |
| 4,497,642 A | * | 2/1985 | Hackney | 55/422 |
| 4,792,344 A | | 12/1988 | Belcher et al. | |
| 5,599,363 A | * | 2/1997 | Percy | 55/352 |
| 5,912,423 A | * | 6/1999 | Doughty et al. | 55/354 |
| 5,993,519 A | | 11/1999 | Lim et al. | |
| 6,063,170 A | * | 5/2000 | Deibert | 96/224 |
| 6,152,998 A | * | 11/2000 | Taylor | 96/429 |
| 6,168,646 B1 | * | 1/2001 | Craig et al. | 55/354 |
| 6,174,349 B1 | * | 1/2001 | DeSantis | 55/481 |
| 6,632,269 B1 | * | 10/2003 | Najm | 55/354 |
| 6,648,947 B2 | * | 11/2003 | Paydar et al. | 55/422 |
| 6,743,282 B2 | * | 6/2004 | Najm | 96/429 |

* cited by examiner

Primary Examiner—Jason M. Greene
(74) Attorney, Agent, or Firm—Carlson, Gaskey & Olds

(57) ABSTRACT

A filter system includes a source of clean filter media adjacent a channel through which fluid passes. The filter media is automatically advanced from the source to the channel and eventually to a sealed container adjacent the channel. The filter media is automatically advanced through the channel, where it is replaced with clean filter media in the channel. A controller controls the advancement of the filter media based upon time or based upon a current condition of the filter media.

20 Claims, 2 Drawing Sheets

FILTER SYSTEM WITH AUTOMATIC MEDIA REFRESH

BACKGROUND OF THE INVENTION

The present invention relates generally to filters, such as for heating, ventilation and air-conditioning ("HVAC") systems, and more particularly to a particulate filter with a system for automatically replacing a filter media.

Many HVAC systems include one or more indoor air quality filters, such as ultraviolet photocatalytic oxidation or plasma combined with a particulate filter. Air passes through the particulate filter and then through the next air quality filter component where gas phase and bioaerosol contaminants can be removed. When the filter media in the particulate filter begins to fill with contaminants, flow through the system is reduced. Therefore, periodically the filter media in the particulate filter must be replaced. Currently, the filter media in the particulate filter is replaced manually at regular time intervals. The filter media will be replaced at the regular time intervals whether or not it needs to be replaced. Similarly, if for some reason the filter media fills with contaminants before the regular time interval, the filter media will not be replaced until the regularly scheduled time.

Additionally, when the filter becomes filled with contaminants, the person removing the used filter media may be exposed to the contaminants collected on the filter. The potential exposure to chemical or biological warfare agents exists. Although the danger of the hazard to the person would depend upon many factors, the exposure to the contaminants is undesirable in any event.

SUMMARY OF THE INVENTION

The present invention provides a filter system where the filter media is automatically replaced and where the used filter media is automatically deposited in a sealed container. The present invention thus assures that fresh filter media is always present in the filter, thus reducing the amount of maintenance necessary. Further, by placing the used filter media into a sealed container, the exposure to the person who ultimately carries away the sealed container is minimized.

The advancement of fresh media from a fresh media source through the filter and subsequently to the sealed container may be controlled by a computer. The controls could be part of the HVAC system controls, building management system controls or dedicated controls. The computer may advance the filter media continuously based upon elapsed time. Alternatively, the computer may advance the filter media a predetermined amount at prescribed intervals of time. Alternatively, the computer may advance the filter media based upon signals from sensors in the system indicating a condition of the filter media. For example, pressure sensors indicating a threshold pressure drop across the filter media may indicate a level of contaminants on the filter media that would require replacement of the filter media.

Two particular embodiments are disclosed. In the first, individual filter cartridges are advanced automatically from the source, through the filter, and eventually to the sealed container. In the second embodiment, a long continuous strip of filter media is rolled up inside the filter media source and advanced through the filter, and subsequently coiled in the sealed container.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENTS

Figure 1:
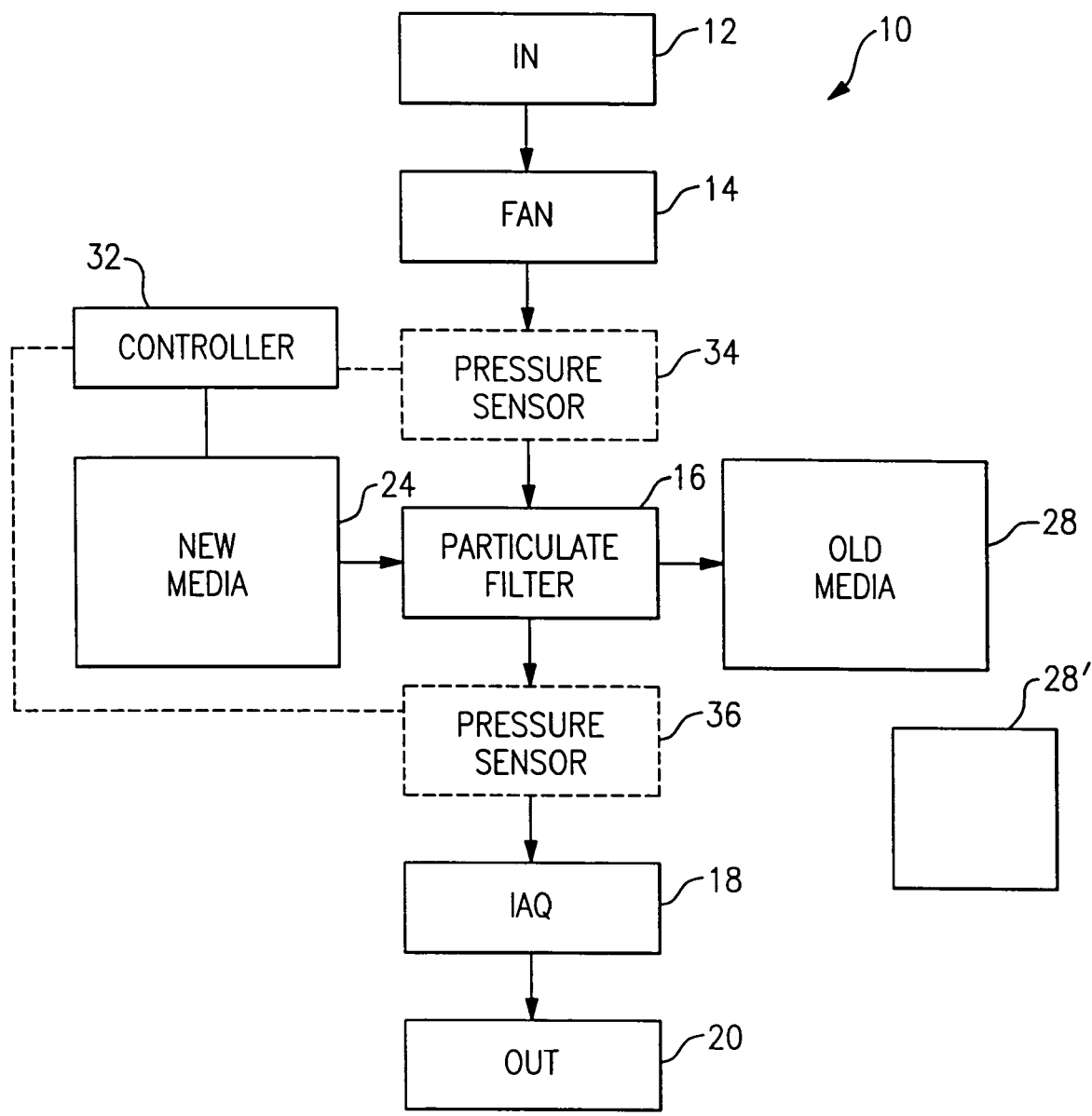
FIG. 1 is a schematic of a HVAC system including a filter system of the present invention.

FIG. 1 schematically illustrates an HVAC system 10 according to the present invention. Generally, air is drawn into the system 10 through an intake 12 by fan 14. The air then passes through a particulate filter 16 where particulate contaminants are removed from the air. The air may then flow through an indoor air quality filter 18, such as an ultraviolet photocatalytic oxidizer or plasma where gas phase and bioaerosol contaminants are removed. The air is then returned from the system 10 via outlet 20.

In the present invention, new or clean filter media is continuously or repeatedly supplied to the particulate filter 16 from a new media source 24. As the new filter media enters the particulate filter 16 from the new media source 24, the used filter media is advanced into the old media container 28, which is preferably a sealed container. Optionally, the sealed container 28 may have anti-microbial material 29 on its inner surface or may be made of an anti-microbial material 29. Alternatively, or additionally, the sealed container 28 may have an attached dispenser 30 of anti-microbial and/or chemical neutralizing agent.

The advancement of the media is preferably controlled by a controller 32, which may be a computer having memory containing a computer program programmed to perform the functions described. The controller 32 may advance the media based upon elapsed time. The controller 32 may advance the filter media at a continuous rate very slowly, or the controller 32 may, at fixed regular time intervals, advance the filter media from the new media source 24 to the filter 16 and from the filter 16 to the old media container 28.

Optionally, the system 10 may further include pressure sensors 34, 36 upstream and downstream of the particulate filter 16. By measuring a pressure drop across the particulate filter 16, the controller 32 can determine the level of contaminants contained in the filter media in the filter 16. Controller 32 would then advance the filter media when it reaches the predetermined level of filtered contaminants. Optionally, the controller 32 would advance the filter media based upon a combination of time and the condition of the filter media in the filter 16, e.g. advancing the filter media when a certain pressure drop is measured or when a certain time interval is reached, whichever occurs first. Optionally, the speed of the fan may be determined by the motor controls to determine when the filter is to be replaced. Alternatively, air flow measurements could be used to determine when the filter is to be replaced.

Old media in the old media container 28 is optionally treated by the anti-microbial 29 on the surfaces of the old media container 28 and/or the anti-microbial agent and/or chemical neutralizing agent in the dispenser 30. The dispenser 30 may be manually activated or periodically activated by the controller 32.

When the old media container 28 is filled, a maintenance person removes the old media container 28 from the filter 16 and seals the container 28. A new, empty old media container 28' is then installed adjacent the particulate filter 16, to receive additional contaminated filter media.

Therefore, in the present invention, servicing of the system 10 is greatly reduced, while continued optimal performance of the particulate filter 16 is improved. Exposure to the contaminated filter media is not only reduced because the exposures occur much less frequently, but exposure to the contaminated filter media during a single maintenance visit is significantly reduced or eliminated by the sealed old media container 28.

Figure 2:
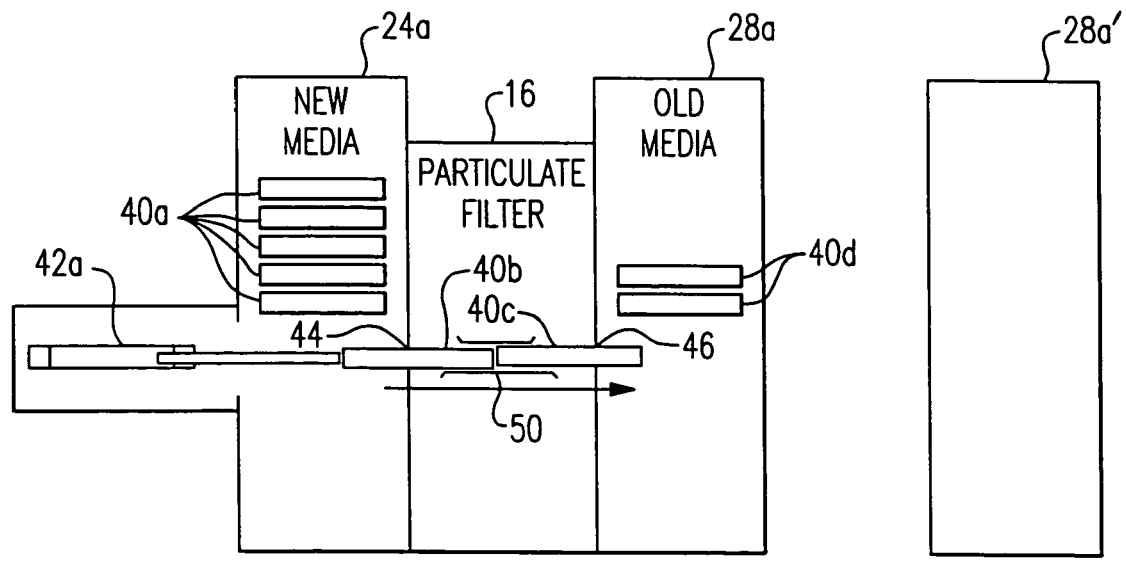
FIG. 2 is a schematic of a first embodiment of the filter system of FIG. 1.

FIG. 2 schematically illustrates a first embodiment of the filter system of FIG. 1. In the first embodiment, the filter media is in the form of filter media cartridges 40 (including 40a, 40b, 40c and 40d). Clean filter media cartridges 40a are stored in the new media source 24a. Used media cartridges 40d are stored in the repository, i.e. the sealed container 28a. An actuator 42a, such as a motor, in the media source 24a advances a clean filter media cartridge 40b through an opening 44 into the particulate filter 16. The advancing new media cartridge 40b advances the used filter media cartridge 40c through an opening 46 into the sealed container 28a. As explained above, the sealed container 28a may optionally include the anti-microbial material 29 and/or the anti-microbial and/or chemical neutralizing agent dispenser 30. Inside the particulate filter 16, the filter media cartridge 40b is supported by brackets 50 (shown schematically) in a channel of the filter 16 through which air flows.

In operation, the filter media cartridges 40 are sequentially advanced from the new media source 24a, to the particulate filter 16, to the sealed container 28a, as controlled by the controller 32 (FIG. 1) in the manner described above. When the sealed container 28a is full, the opening 46 is closed and the sealed container 28a is then removed from the filter 16 and replaced with an empty sealed container 28a'. Thus, the operator avoids exposure to the contaminated filter media 40d within the sealed container 28a. The supply of new filter media cartridges 40a in this source 24a is periodically replenished.

Figure 3:
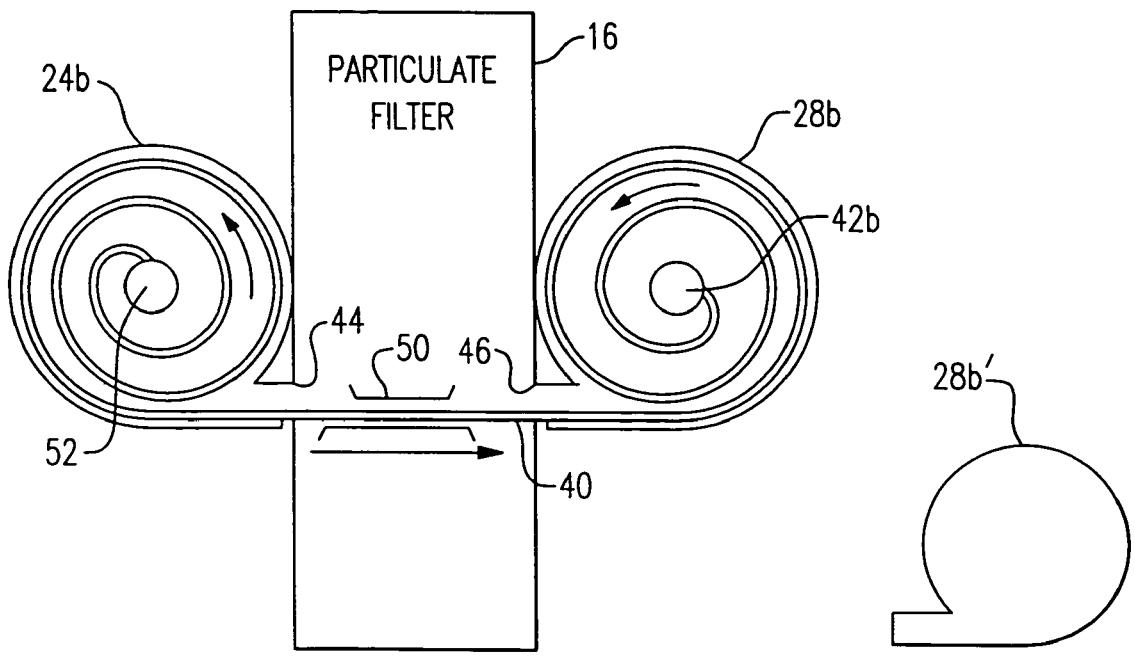
FIG. 3 is a schematic of a second embodiment of the filter system in FIG. 1.

A second embodiment of the filter system of FIG. 1 is illustrated schematically at FIG. 3. In the second embodiment, the filter media 40 is in the form of an elongated strip, which is initially coiled within the new media source 24b. A filter media 40 is advanced through the particulate filter 16, where it is supported by brackets 50 in a channel of the filter 16 through which air flows. As the filter media 40 becomes filled with contaminants, the filter media 40 is coiled within the sealed container 28b. As explained above, the sealed container 28b may optionally include the anti-microbial material 29 and/or the anti-microbial and/or chemical neutralizing agent dispenser 30.

The filter media 40 may be advanced by an actuator 42b, which may comprise a motor powered spool coiling the filter media 40 within the sealed container 28b. The actuator 42b is controlled by the controller 32 (FIG. 1) in the manner described above. The filter media 40 may be coiled about a spool 52 in the new media source 24b, which may be free spinning, or may also be motor driven and controlled by the controller 32 (FIG. 1). In the second embodiment, in addition to the techniques described above, the filter media 40 may optionally be advanced continuously at some slow rate or in small increments at certain time intervals. When the sealed container 28b is full of contaminated media 40, the opening 46 is closed and the sealed container 28b is removed from the particulate filter 16. A new, empty sealed container 28b' is then attached to the particulate filter 16.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope.

What is claimed is:

1. A filter system comprising:
   a channel through which fluid passes;
   a source containing a plurality of clean filter media cartridges adjacent the channel; and
   a repository for used filter media cartridges adjacent the channel, wherein clean filter media cartridges travel from the source through the channel to collect a contaminant, and wherein the filter media cartridges travel from the channel to the repository.

2. The filter system of claim 1 wherein the plurality of cartridges are stored in the repository when used.

3. The filter system of claim 2 wherein the repository ultimately contains the plurality of filter media cartridges.

4. The filter system of claim 3 wherein a subset of the plurality of filter cartridges is in the channel at any given moment.

5. The filter system of claim 1 further including a controller controlling the travel of the filter media cartridges from the source, to the channel and to the repository.

6. The filter system of claim 5 wherein the travel depends upon time.

7. The filter system of claim 5 wherein the travel depends upon a condition of the filter media cartridge in the channel.

8. The filter system of claim 7 wherein the travel depends on a level of contaminant in the filter media cartridge.

9. The filter system of claim 8 further including at least one pressure sensor for measuring a pressure drop across the filter media cartridge in the channel, the travel based upon the pressure drop.

10. The filter system of claim 1 further including a dispenser for dispensing a material for treating the contaminant.

11. The filter system of claim 10 wherein the material includes an anti-microbial agent.

12. A method for operating a filter system including the steps of:
   a) advancing a clean filter media cartridge from a source container storing a plurality of clean filter media cartridges into a channel through which a fluid passes;
   b) collecting contaminants from the fluid in the filter media cartridge in the channel; and
   c) advancing the filter media cartridge with the contaminants from the channel to a repository container adjacent the channel.

13. The method of claim 12 wherein said steps a) and c) are performed based upon time.

14. The method of claim 12 wherein said steps a) and c) are performed based upon information from at least one sensor.

15. The method of claim 14 wherein said steps a) and c) are performed based upon information from at least one pressure sensor.

16. The method of claim 12 wherein said steps a) and c) are performed simultaneously.

17. The method of claim 12 further including the step of:
   removing the repository container containing filter media cartridge with contaminants and placing a new, empty sealed repository container adjacent the channel.

18. The method of claim 12 further including the step of dispensing an anti-microbial material into the container to treat the filter media cartridge with contaminants.

19. The method of claim 12 further including the step of advancing the plurality of filter media cartridges from the channel into the repository container and storing the plurality of filter media cartridges in the container.

20. The method of claim 19 further including the step of removing the repository container containing the plurality of filter media cartridges with contaminants and placing a new, empty, sealed repository container adjacent the channel.

* * * * *